UNITED STATES PATENT OFFICE.

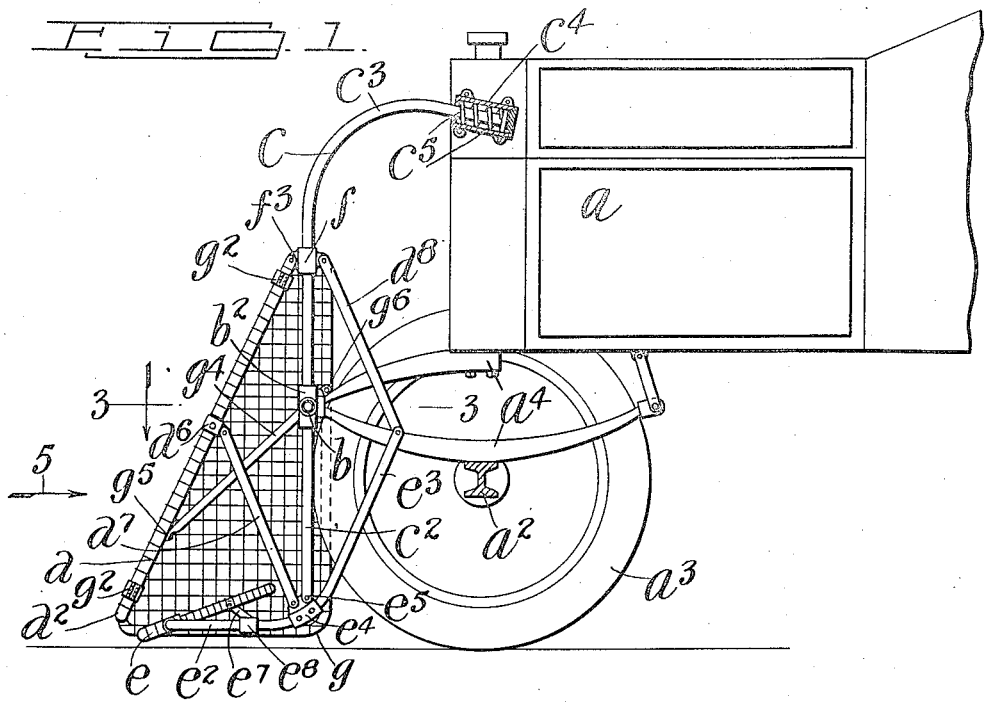
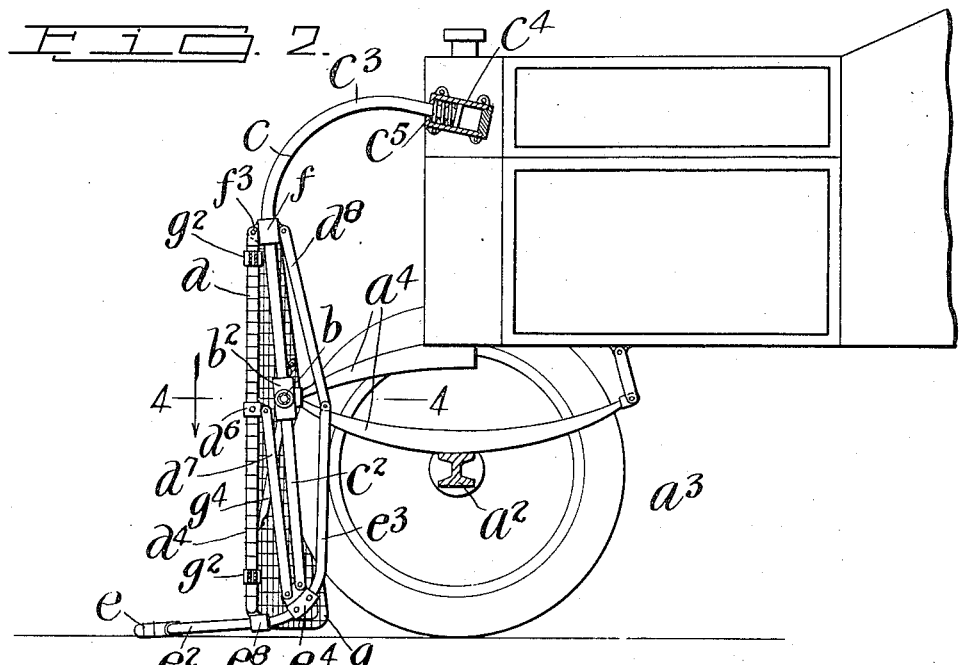

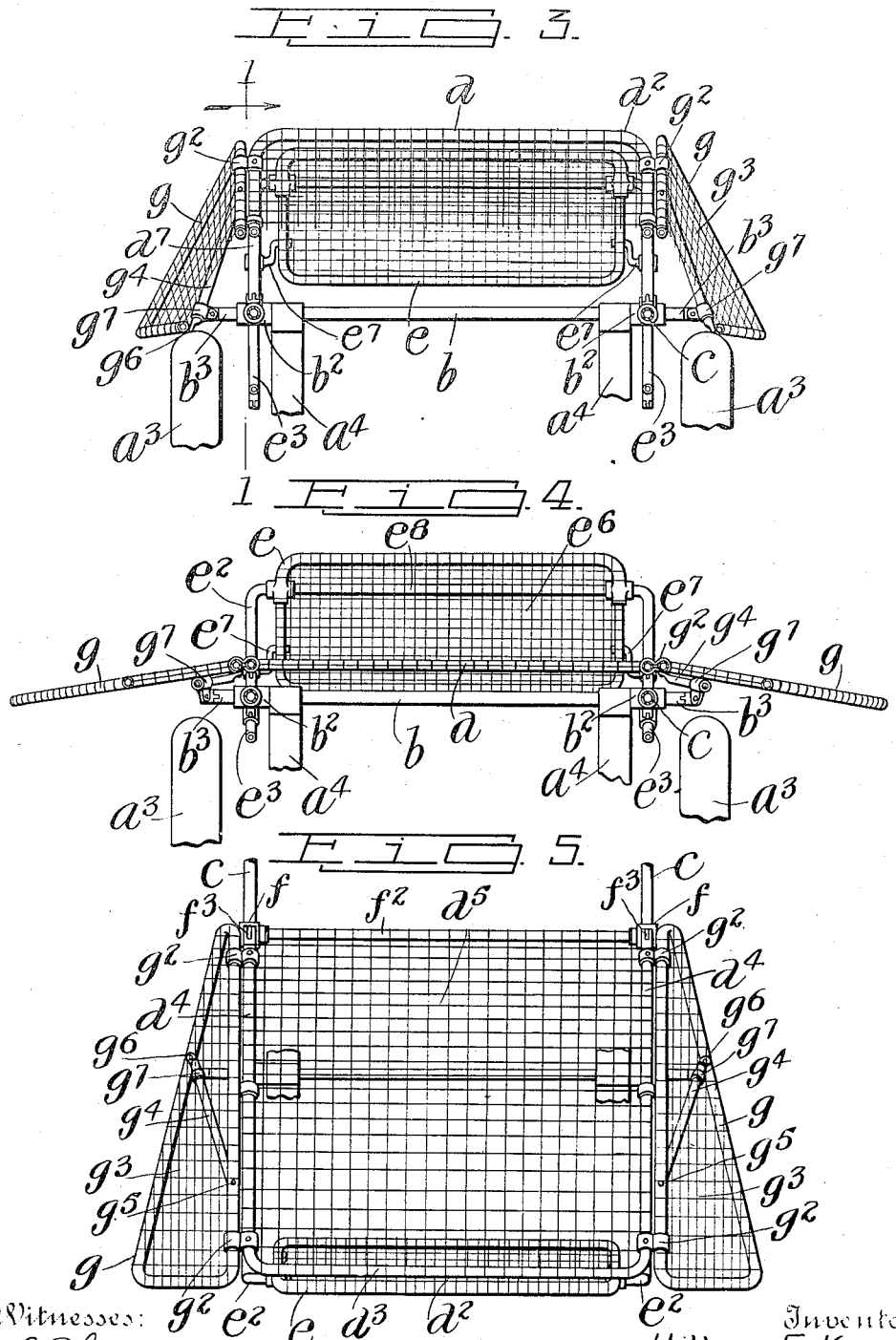

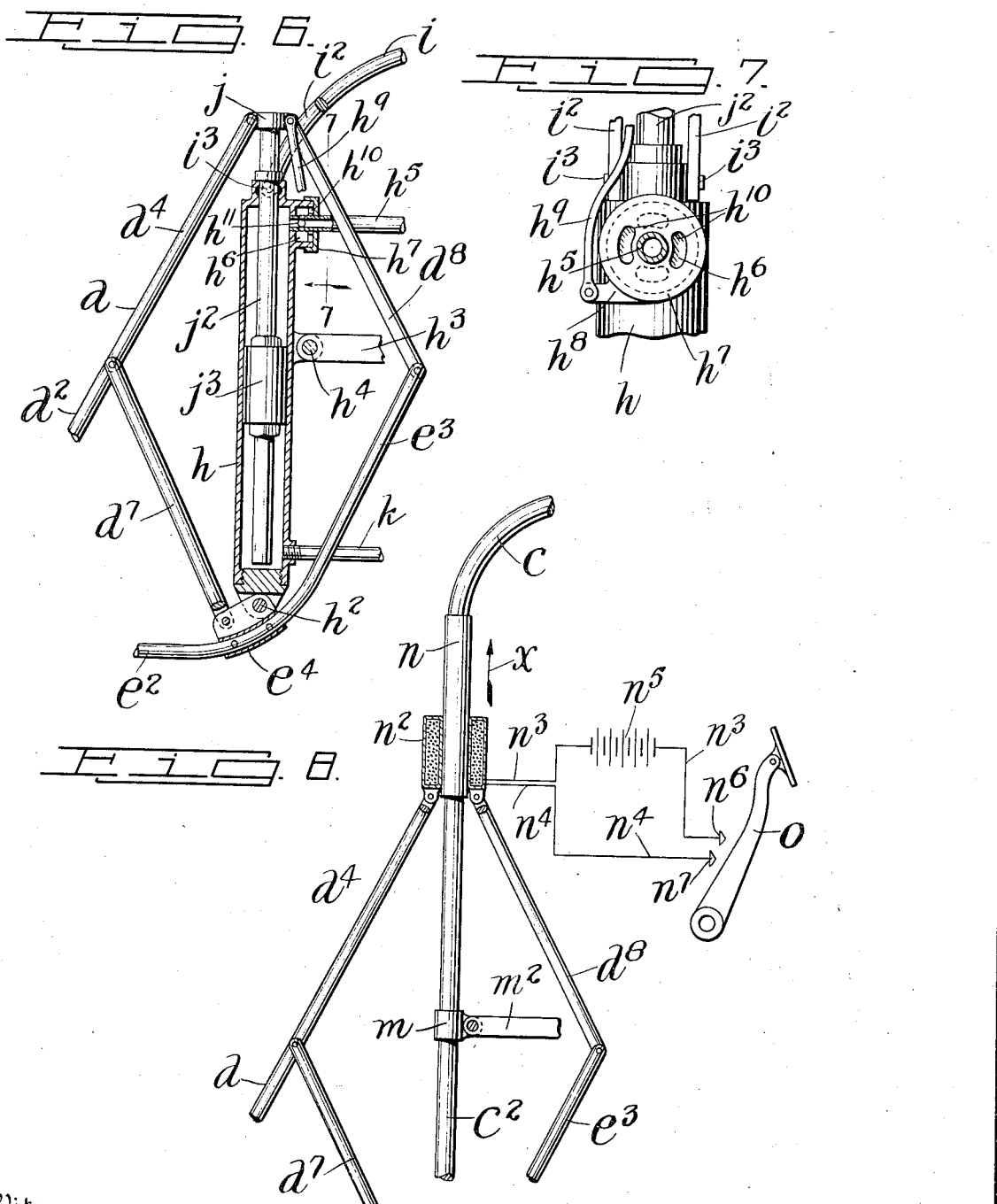

HILLARY E. KEFFER, OF BROOKLYN, NEW YORK.

SAFETY MOTOR-CAR GUARD.

1,150,124.

Specification of Letters Patent.

Patented Aug. 17, 1915.

Application filed August 8, 1914. Serial No. 855,746.

*To all whom it may concern:*

Be it known that I, HILLARY E. KEFFER, a citizen of the United States, and residing at Brooklyn, in the county of Kings and State of New York, have invented certain new and useful Improvements in Safety Motor-Car Guards, of which the following is a specification, such as will enable those skilled in the art to which it appertains to make and use the same.

This invention relates to safety guards or fenders for automobiles, tramway cars, and other power driven vehicles and the object thereof is to provide an improved guard or fender of the class specified which will operate to prevent the serious and sometimes fatal accidents resulting from the striking of a person by vehicles of this class when in motion; and which will prevent the person struck from passing under the vehicle or under the wheels thereof, and with this and other objects in view the invention consists of a fender or guard for vehicles of the class specified constructed and operating as hereinafter described and claimed.

The invention is fully disclosed in the following specification of which the accompanying drawings form a part, in which the separate parts of my improvement are designated by suitable reference characters in each of the views, and in which:

Figure 1 is a sectional side view of the front part of an automobile provided with my improved fender or guard in position to be operated, the section being on line 1—1 Fig. 3; Fig. 2, a view similar to Fig. 1, but showing the fender or guard in the position it assumes when operated; Fig. 3, a horizontal sectional view on the lines 3—3, of Fig. 1; Fig. 4, a horizontal sectional view on the line 4—4 of Fig. 2; Fig. 5, a front view of the construction as shown in Fig. 1 and looking in the direction of the arrow 5 of Fig. 1; Fig. 6, a view similar to Fig. 1 but showing only parts of the operative mechanism and showing means for throwing the fender or guard into the position shown in Fig. 2, said means being operated by compressed air from the air brake system with which the vehicle is provided; Fig. 7, a section on the line 7—7 of Fig. 1 and on an enlarged scale; and,—Fig. 8 a view similar to Fig. 6, but showing electrical means for throwing the parts of the fender or guard into the position shown in Fig. 2.

In the drawing forming part of this specification I have shown at $a$ the front part of the body of an automobile having a front axle $a^2$ provided with front wheels $a^3$, and at $a^4$ I have shown the usual side springs which are mounted on the front axle, and secured to the body $a$, and said springs are of the usual elliptical type.

In the practice of my invention I mount in the front ends of the springs $a^4$ a transverse shaft $b$ the ends of which project to the plane of the wheels $a^3$, and mounted on said shaft outside of the springs $a^4$, are four-way couplings $b^2$, which are free to rotate on said shaft, and the ends $b^3$ of said shaft project from said couplings. I also provide vertically arranged and curved side arms $c$ having vertical lower end parts $c^2$, and backwardly curved top end portions $c^3$ which pass into housings $c^4$ secured to the front end of the body of the vehicle, and on which are mounted springs $c^5$ which hold said arms in said housings, and the lower end portions $c^2$ of the arms $c$ are composed of separate parts which are connected with the four-way couplings $b^2$.

The operative parts of my improved fender or guard consist of a front apron buffer or guard $d$ and a bottom and approximately horizontal tray guard $e$. The tray guard $e$ is mounted on the front cross head of a yoke-shaped frame $e^2$ having upwardly and backwardly directed side arms $e^3$, and secured to the elbow portions of the arms $e^3$ are keepers $e^4$ to which the bottom end parts $c^2$ of the arms $c$ are pivoted, as shown at $e^5$.

The tray guard $e$ comprises an approximately rectangular frame having a body portion $e^6$ of wire mesh or similar material and pivoted in the ends thereof and nearer the rear side thereof than the front side are L-shaped link members $e^7$ which are also pivoted to sleeves $e^8$ slidably mounted on the horizontal portions of the sides of the yoke-shaped frame $e^2$. The tray guard $e$ is rotatably mounted on the cross head portion $e^8$ of the yoke-shaped frame $e^2$, and the front portion of said tray guard is much heavier than the rear portion thereof, and by reason of this fact said tray guard normally assumes the downward and forward inclination shown in Fig. 1 when the parts are in condition for use.

Slidably mounted on the arms $c$ above the shaft $b$ are sleeves $f$, which are connected by a transverse rod $f^2$, and this rod $f^2$ forms a part of the frame of the apron buffer or guard $d$, the rest of which consists of a yoke-shaped frame $d^2$ comprising a front cross head portion $d^3$, and side arms $d^4$ the ends of which are pivoted or hinged to the sleeves $f$ at $f^3$ and the frame of the apron guard $d$ is provided with a wire mesh body $d^5$, and secured to the side members $d^4$ of the frame of the apron guard $d$ are collars $d^6$ to which are pivoted link members $d^7$ which are also pivoted to the keepers $c^4$, and pivoted to the sleeves $f$ are other link members $d^8$ which are also pivoted to the ends of the upwardly directed side arms $e^3$ of the yoke-shaped frame $e^2$. My improved fender or guard also comprises side wings $g$ which consist of triangular frames hinged to the side members $d^4$ of the yoke-shaped frame $d^2$ of the apron guard $d$ by means of double keepers $g^2$ or in any other suitable way. The wider ends of the side wings $g$ are directed outwardly and the frames thereof are provided with wire mesh bodies $g^3$, and said frames are provided with braces $g^4$ which are secured to the inner sides thereof at $g^5$ and to the outer sides thereof at $g^6$, and are diagonally arranged as shown and said braces are passed through keepers $g^7$ pivoted to the ends $b^3$ of the shaft $b$ and through which they are freely moved.

The normal and operative position of the parts of my improved fender or guard is that shown in Figs. 1, 2 and 5, in which the wings $g$ extend outwardly and backwardly in front of the wheels $a^3$, and if a person be struck by the vehicle when in motion, the apron guard $d$ would receive the impact of the blow, and all the parts of the fender or guard would be thrown in the position shown in Figs. 2 and 4, in which position the apron guard $d$, which normally projects downwardly and forwardly, would be thrown backwardly and into an upright position, while the tray guard $e$ would be projected and depressed and the person struck would be caught thereon, and the passing of such person under the vehicle would be prevented. It will also be observed that when the fender or guard is set for use as shown in Figs. 1, 3 and 5 the wings $g$ will prevent a person from being struck by either of the wheels $a^3$, and prevent such person from passing under said wheels even though he may not be struck by the main central part or parts of the fender or guard. It will also be seen that in the above described operation, the entire fender or guard is tilted forward slightly on the shaft $b$ and the arms $c$ are partly withdrawn from the housings $c^4$, as clearly shown in Fig. 2, but when the weight of the person struck is removed from the tray guard $e$ the various parts of the apparatus will automatically be returned to the position shown in Figs. 1, 3 and 5 and the fender or guard will be again in position for use. It will also be observed from the foregoing description and accompanying drawings that in the operation of the fender or guard as described, the tray guard $c$ rotates between the sides of the yoke-shaped frame $c^2$, and the apron guard $d$ swings thereover, in both its backward and forward movement, and said apron guard $d$, when in the position shown in Fig. 2, holds the tray guard $e$ in its flat or horizontal position. It will also be seen that the link members $d^7$ and $d^8$ form opposite side parts of parallelogram frames, the other side portions of which consist of upwardly directed side arms $c^3$ of the yoke-shaped frame $e^2$, and the upper end portion of the sides $d^4$ of the yoke-shaped frame $d^2$ of the apron guard $d$, and these parallelogram frames, operate as toggle levers to insure the operation of the parts of the fender or guard as herein shown and described.

In Figs. 6 and 7 I have shown means under the control of the operator of the vehicle for throwing the parts of the fender or guard into the positions shown in Figs. 2 and 4, said means consisting of vertically arranged cylinders $h$ pivotally connected with the keepers $c^4$ at $h^2$, and also connected with the side bars $h^3$ of the truck frame to which they are pivoted at $h^4$, said side bars $h^3$ of the truck frame projecting in the usual manner. With this construction I substitute for the arms $c$ other arms $i$ which are secured to the front of the vehicle by means of housings, not shown, but similar to those shown at $c^4$ in Fig. 1, and the arms $i$ are forked to form side members $i^2$ between which the tops of the cylinders $h$ are pivoted at $i^3$. In this form of construction the parallelogram frame members $d^4$ and $d^8$ are pivoted to head blocks $j$ which take the place of the sleeves $f$ and which are provided with piston rods $j^2$ which pass downwardly into the cylinders $h$ and are provided with pistons $j^3$, and connected with the tops of the cylinders $h$ are emergency brake air pipes $h^5$ which are connected with the emergency air brake apparatus carried by the vehicle, and the connection of the pipes $h^5$ with the cylinders $h$ are made by means of valve casings $h^6$ having valves $h^7$ provided with arms $h^8$ with which are connected rods $h^9$ which are also connected with the heads $j$. The valves $h^7$ are provided with ports $h^{10}$, and the valve casings $h^6$ with corresponding ports, and the pipes $h^5$ are provided within the valve casings with ports $h^{11}$. The bottoms of the cylinders $h$ are also provided with air brake pipes $k$ which are connected with the air brake system or apparatus carried by the vehicle and by means of this construction the pistons $j^3$ will normally be held in the balanced position shown in Fig. 6 when the fender or guard is in the operative position shown in Fig. 1. With the parts of this construction in the position shown in Fig. 6 if a person should be struck by the vehicle when in motion, the parts of the fender or guard would be thrown in the position shown in Fig. 2, and in this operation the pistons $j^3$ would be moved upwardly and the valves $h^7$ would be opened and the air from the brake system would be exhausted and the brakes would be applied and the vehicle would be brought to a stop.

If the operator of the vehicle, when the parts of the fender or guard are in the position shown in Fig. 1 should see or observe a person about to be struck by the vehicle he may operate his emergency brake in the usual manner and this operation would exhaust the air in the pipes $h^5$ in the usual manner, together with the air in the top portions of the cylinders $h$, and the fender or guard, or the parts thereof would be thrown in the position shown in Fig. 2 by the pressure of air from the brake system carried by the air entering the bottom portions of the cylinders $h$ through the pipes $k$.

In Fig. 8 I have shown electrical means under the control of the operator of the vehicle or car for throwing the parts of the fender or guard into the position shown in Fig. 2, said means consisting of the arms $c$ employed in Figs. 1 and 2, but the lower end portions of which are connected with the side bars $m^2$ of the vehicle truck frame by means of sleeves $m$ mounted on said arms and which are pivoted to said side bars, said side bars projecting in the usual manner and in connection with the arms $c$ I provide tubular sleeves $n$ which are mounted thereon and on which are placed electro-magnets $n^2$ which are movable vertically on said sleeves, and the sleeves $n$ form the cores of the magnets $n^2$, and the parts $d^4$ and $d^8$ of the parallelogram side frames are connected with the magnets $n^2$.

The magnets $n^2$ are provided with circuit wires $n^3$ and $n^4$ and in the circuit thus formed is placed a battery $n^5$ and the said wires $n^3$ and $n^4$ are provided with contact posts or parts $n^6$ and $n^7$, arranged adjacent to the ordinary emergency brake lever $o$ and in the operation of applying the emergency brakes on the car or vehicle the levers $o$ will complete the circuit through the wires $n^3$ and $n^4$ and the magnets $n^2$ will be raised or moved in the direction of the arrow $x$, and the parts of the fender or guard will be thrown into the position shown in Fig. 2. The magnets $n^2$ in connection with the core $n$ form an ordinary solenoid the operation of which will be as herein described and after the parts of the fender or guard have been thrown in the position shown in Fig. 2, they will be returned automatically to the operative position shown in Fig. 1 when the circuit through the wires $n^3$ and $n^4$ is broken.

From the foregoing description it will be seen that my improved fender or guard will operate to accomplish the results specified, when the parts thereof are in the position shown in Figs. 1, 3 and 5, or said parts may first be thrown into the position shown in Figs. 2 and 4, in which they will operate and prevent a person struck from passing under the vehicle, but a person struck by the fender or guard would be more apt to be injured when the parts are in the position shown in Figs. 2 and 4 than when said parts are in the position shown in Figs. 1, 3 and 5 by reason of the fact that when the parts of the fender or guard are in the position shown in Figs. 2 and 4, they would not have the yielding qualities that they have when in the position shown in Figs. 1, 3 and 5.

The construction shown in Figs. 1 to 5 inclusive is the preferred construction, and while I have shown and described different forms of mechanism for throwing the parts of the guard or fender into the position shown in Figs. 2 and 4, my invention is not limited thereto, nor to any other specific construction or apparatus for accomplishing this result, various forms of which might be provided, and it will also be understood that my invention is not limited to the details of construction shown in Figs. 1 to 5 inclusive, and changes therein and modifications thereof may be made, within the scope of the appended claims, without departing from the spirit of my invention, or sacrificing its advantages.

It must be borne in mind that my invention is not limited to any particular means for or method of connecting my improved fender or guard with motor vehicles or cars, and although I have shown said fender or guard connected with the front side springs of an automobile in Figs. 1 and 2, and with the parts $h^3$ and $m^2$ of a motor car truck frame, or parts connected with such frame in Figs. 6 and 8, the said fender or guard may be connected with an automobile truck frame, or with a tramway car truck frame, or with a power driven vehicle of any kind or class, in any suitable way, or by any preferred means.

Having fully described my invention what I claim as new and desire to secure by Letters Patent, is:—

1. In a fender or guard for vehicles, a movably suspended apron guard, a supplemental tray guard pivotally supported in a transverse position below said apron guard and a collapsible supporting structure connecting said apron guard and tray guard and also connecting said parts with the vehicle, the apron guard being adapted to swing forwardly and backwardly over the tray guard.

2. In a fender or guard for vehicles, a movably suspended apron guard, a supplemental tray guard pivotally supported in a transverse position below the apron guard and a collapsible supporting structure connecting said apron and said tray guards and also connecting said guards with the vehicle, said structure and said apron and tray guards having a forward and backward rocking movement when collapsed and the apron guard being adapted to swing forwardly and backwardly over the tray guard.

3. In a fender or guard for vehicles, a movably suspended apron guard, a supplemental tray guard pivotally supported in a transverse position below the apron guard and a collapsible supporting structure connecting said apron and said tray guards and also connecting said parts with the vehicle, said structure involving parallelogram side members which operate as toggle levers 4. In a fender or guard for vehicles, a movably suspended apron guard, a supplemental tray guard pivotally supported in a transverse position below the apron guard and a collapsible supporting structure connecting said apron and said tray guards and also connecting said parts with the vehicle, said structure involving parallelogram side members which operate as toggle levers, said supporting structure and said guards having a forward and backward rocking movement when collapsed and the apron guard also having a forward and backward movement over the tray guard.

5. In a fender or guard for vehicles, a movably suspended apron guard, a supplemental tray guard pivotally supported in a transverse position below the apron guard, and a collapsible supporting structure connecting said guards and also connecting said parts with the vehicle, and means under the control of the operator of the vehicle for collapsing the parts of the fender or guard.

6. In a fender or guard for vehicles, a movably suspended apron guard, a supplemental tray guard, pivotally supported beneath the apron guard, and a collapsible supporting structure connecting said apron guard and said tray guard and connecting said parts with the vehicle, said collapsible structure involving toggle lever side members and means under the control of the operator of the vehicle for collapsing parts of said fender or guard.

7. In a fender or guard for vehicles, a movably suspended apron guard, a supplemental tray guard pivotally supported in a transverse position below the apron guard, and a collapsible supporting structure connecting said apron guard and said tray guard and also connecting said apron guard with the vehicle, said supporting structure and the apron guard and tray guard having a forward and backward rocking movement when collapsed and the apron guard being adapted to swing forwardly and backwardly over the tray guard and means under the control of the operator of the vehicle for collapsing separate parts of the fender or guard.

8. In a fender or guard for vehicles, a movably supported apron guard, and a supplemental tray guard pivotally supported in a transverse position below the apron guard, and means for giving the bottom edge of the apron guard a forward and backward movement and the top edge thereof a vertical movement and also for giving the tray guard a vertical and tilting movement, the bottom edge of said apron guard being movable forwardly and backwardly over the tray guard.

9. In a fender or guard for vehicles, a tray guard movably supported in a horizontal and downwardly and forwardly inclined position and an apron guard movably supported in an upright position above the tray guard, said apron guard being adapted to move forwardly and backwardly over the tray guard, and said tray guard having a vertical and tilting movement.

In testimony that I claim the foregoing as my invention I have signed my name in presence of the subscribing witnesses this 7th day of October 1914.

HILLARY E. KEFFER.

Witnesses:
C. MULREANY,
H. E. THOMPSON.